United States Patent [19]
Burt

[11] Patent Number: 5,298,057
[45] Date of Patent: Mar. 29, 1994

[54] DISTRIBUTOR VALVE FOR MULTIPLE CELL FILTER

[75] Inventor: Arthur W. Burt, Lakeland, Fla.

[73] Assignee: Baker Hughes Incorporated, Houston, Tex.

[21] Appl. No.: 72,340

[22] Filed: Jun. 4, 1993

[51] Int. Cl.$^5$ .............................................. B01D 19/00
[52] U.S. Cl. ......................................... 96/197; 55/315; 55/344; 96/198; 210/295; 210/406
[58] Field of Search ................. 55/315, 400, 345, 346, 55/344; 96/124, 194–198, 201; 210/295, 314, 329, 406, 456

[56] References Cited

U.S. PATENT DOCUMENTS

| | | | |
|---|---|---|---|
| 3,713,274 | 1/1973 | Sauer et al. | 96/198 X |
| 4,038,054 | 7/1977 | Graff | 96/124 |
| 4,490,162 | 12/1984 | Davis | 55/315 X |
| 4,971,611 | 11/1990 | Noguchi | 96/124 X |

*Primary Examiner*—Charles Hart
*Attorney, Agent, or Firm*—Choate Hall & Stewart

[57] ABSTRACT

A distribution system for use with a filtering cell comprising an inlet manifold rotatably mounted concentrically above a stationary separator, at least one separation chamber inside the separator connected to a vacuum source, a downwardly extending first baffle located in the separation chamber and a second baffle located outwardly from the first baffle and extending upwardly to a point above the lowest portion of the first baffle.

6 Claims, 4 Drawing Sheets

DISTRIBUTOR VALVE FOR MULTIPLE CELL FILTER

BACKGROUND OF THE INVENTION

This invention relates to separation systems using vacuum filtering cells. More particularly, this invention relates to improvements in the distributor valve which is downstream of the vacuum filtering cells.

Vacuum filtering cells are used to filter industrial feed slurry and in the manufacture of phosphoric acid by the wet method. The distributor valve separates gases from liquids and distributes the filtrates to collecting tanks.

Continuous vacuum filtering cells comprise horizontal filtering cells mounted on a carousel or turntable for periodic charging, draining and washing. Feed slurry is fed into the upper surface of the horizontal cell which includes a filtering element to remove solids from the feed slurry. A liquid/gas filtrate passes through the filter element to the bottom of the filtering cell and thereafter, drains out of the filtering cell through a flexible hose into a central distributor valve. In addition, a vacuum, originating in the distributor valve and applied to the bottom of the cell through the flexible hoses, assists in drawing the liquid/gas filtrate through the filtering element toward the central distributor valve. The remaining solids in the filtering cell are vacuum dried and then removed by inverting the filtering cell.

The distributor valve is divided into chambers and compartments which are connected to vacuum and pressurizing sources, respectively. During operation, the filtering cells are cyclically connected to a primary vacuum source to draw the liquid/gas filtrate through the filtering element toward the distributor valve. Next, the filtering cells are cyclically connected to a secondary vacuum source to dry solids remaining in the filtering cells. The filtering cells are then inverted and cyclically connected to the pressuring source to aid removal of the solid filtration cake from the filtering cells. Finally, the cells are washed and prepared for recharging.

The distributor valve achieves separation of the liquid/gas filtrate by drawing the gas component of the filtrate horizontally toward the vacuum source. The liquid component of the filtrate, which is too heavy to be drawn horizontally, falls vertically into downlegs which are connected to seal tanks for collection of the separated liquid. In the conventional design, as shown in FIG. 1, separation chamber 70 is divided into an inner section 72 and an outer section 74 by a vertical arcuate wall 76 extending the full height of the separation chamber 70. The vertical wall 76 typically has small passageways 78 at the top to permit the gas component of the liquid/gas filtrate to enter the outer section 74. The gas component typically follows a path as shown by the arrow. In addition to the gas flowing between the inner section 72 and the outer section 74, however, a certain amount of vapor containing suspended liquid particulates also flows through the dividing wall 76 into the outer section 74.

During the separation process, scaling forms on the inside surfaces of the distributor, thereby reducing its efficiency and requiring frequent stoppages for cleaning. Scaling often occurs in the distributor as a result of the high velocity of the gas and vapor travelling through the small passageways 78 in the dividing wall 76. The high gas and vapor velocity is a result of the narrow dimensions of the separation chamber 70 and passageways 78. The dissolved particulates in the vapor, which are carried into the outer section 74 as a result of the high gas and vapor velocities also contribute to scaling.

Conventional distributor valves also give rise to a large pressure drop reducing their efficiency. Because the vertical wall 76 introduces a blocking effect, the amount of vacuum reaching the filtering cells is significantly less than the amount of vacuum in the outer section 74 of the separation chamber 70. More specifically, if a vacuum source providing a vacuum of twenty (20) inches of mercury is employed at the distributor valve, the resultant vacuum at the filtering cell may be only fifteen (15) inches of mercury.

SUMMARY OF THE INVENTION

The distributor valve of the present invention reduces scaling and lowers the pressure drop by replacing the single dividing wall with two vertical baffles. The present invention also decreases the vapor velocities in the distributor valve. The distributor valve, according to the present invention, includes a rotating manifold which is connected by flexible hoses to the filtering cells, a stationary distributor valve located concentrically below the manifold, the distributor valve having an inner wall and an outer wall and being divided into chambers and compartments, a downwardly extending first baffle located in the separation chambers, and a second baffle located in the separation chambers between the first baffle and the outer wall and extending upwardly to a point just above the lowest portion of the first baffle.

In operation, the filtering cells are charged with a feed slurry to be separated. The solids portion of the feed slurry is separated by the filtering cell. The liquid/gas filtrate drains into the distributor valve, assisted by the vacuum source. The baffles cause the vapor to undergo a substantial change in direction before entering the outer section of the separation chamber. Consequently, the amount of vapor entering the outer section is reduced, thereby reducing scaling. The liquid component of the liquid/gas filtrate, which is too heavy to be drawn into the outer section by the force of the vacuum, falls under the influence of gravity through liquid downlegs into seal tanks. The distributor valve of the present invention also reduces the pressure drop by effectively enlarging the passageways through which the gas must travel.

DESCRIPTION OF THE PREFERRED EMBODIMENT

Figure 1:
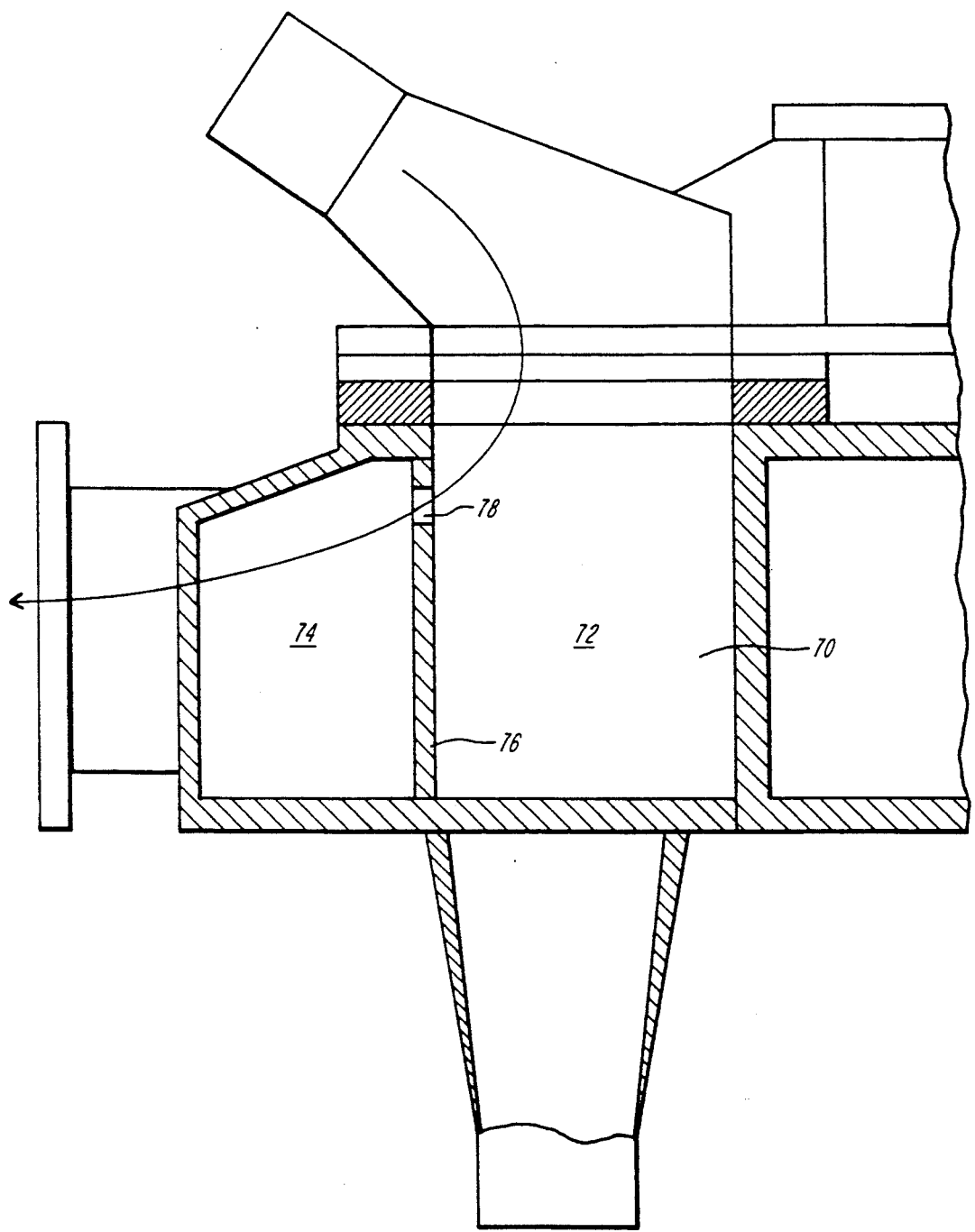
FIG. 1 is a side view of a distributor valve of the prior art.
Figure 2:
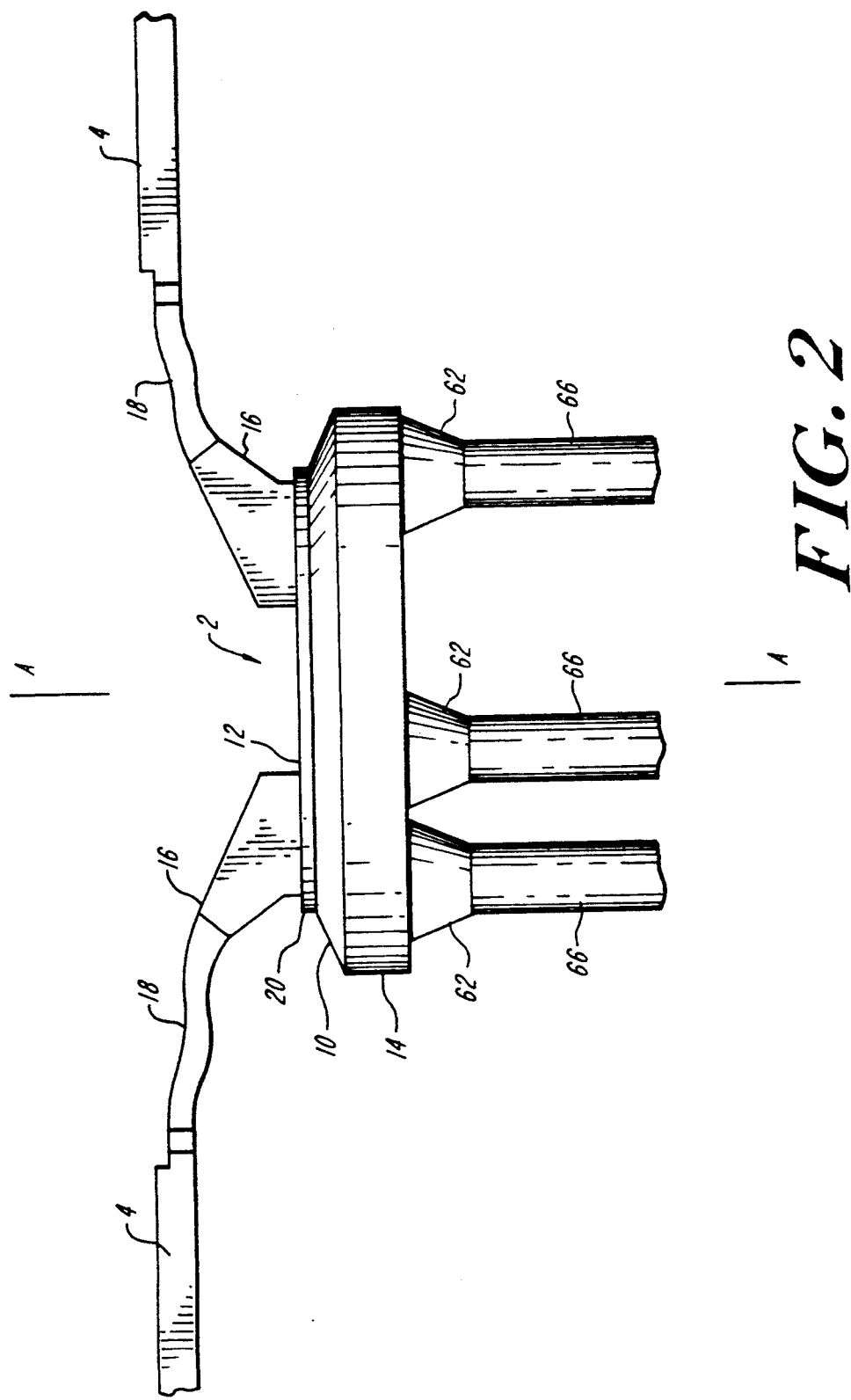
FIG. 2 is a side view of a filtering cell system with the distributor valve of the present invention.

As shown in FIG. 2, the filtering cell system 2 of the present invention includes horizontal filtering cells 4, flexible hoses 18 connecting the cells 4 to a distributor valve 10. The distributor valve 10 according to the invention comprises a rotating inlet manifold 12 mounted concentrically above a stationary separator 14.

The inlet manifold 12 rotates about an axis A—A. The ring-shaped inlet manifold 12 has as many inlets 16 as there are filtering cells 4. The inlet manifold 12 includes a manifold base plate 20. Attached to and in communication with separator 14 are truncated cone shaped ducts 62 and liquid down legs 66. Down legs 66 are connected to seal tanks (not shown).

Figure 3:
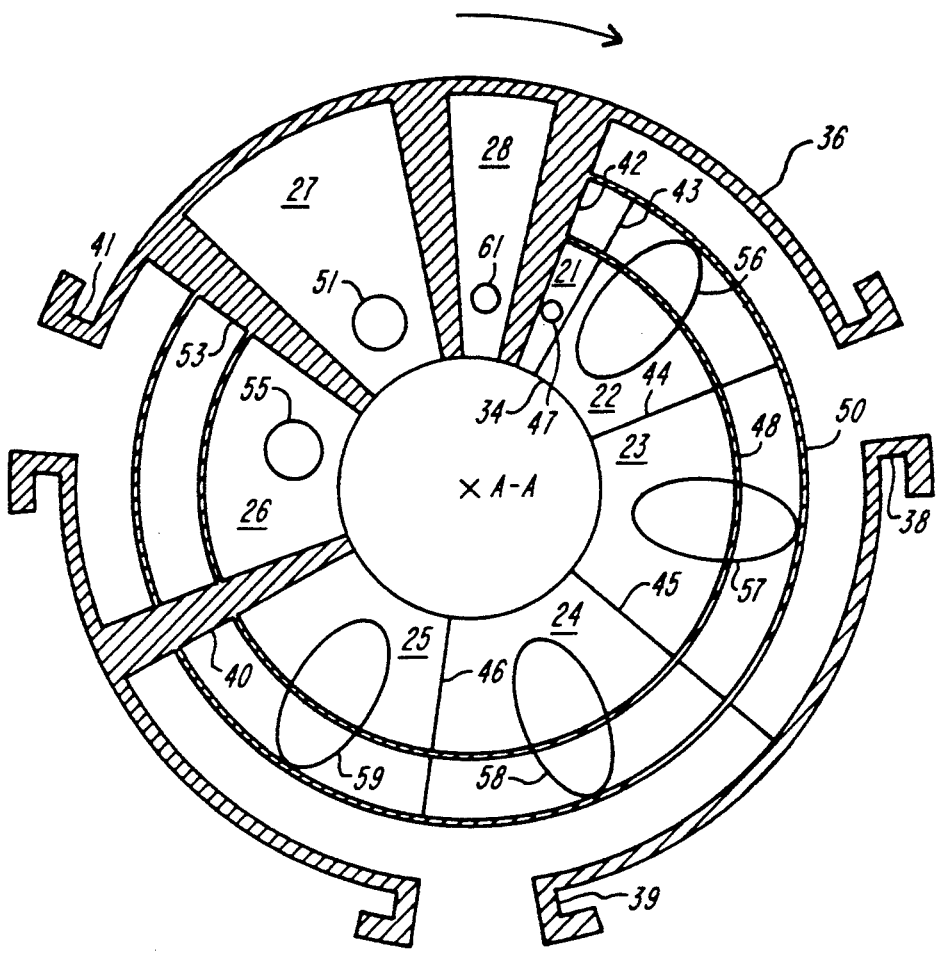
FIG. 3 is a top view of the distributor valve of the present invention.
Figure 4:
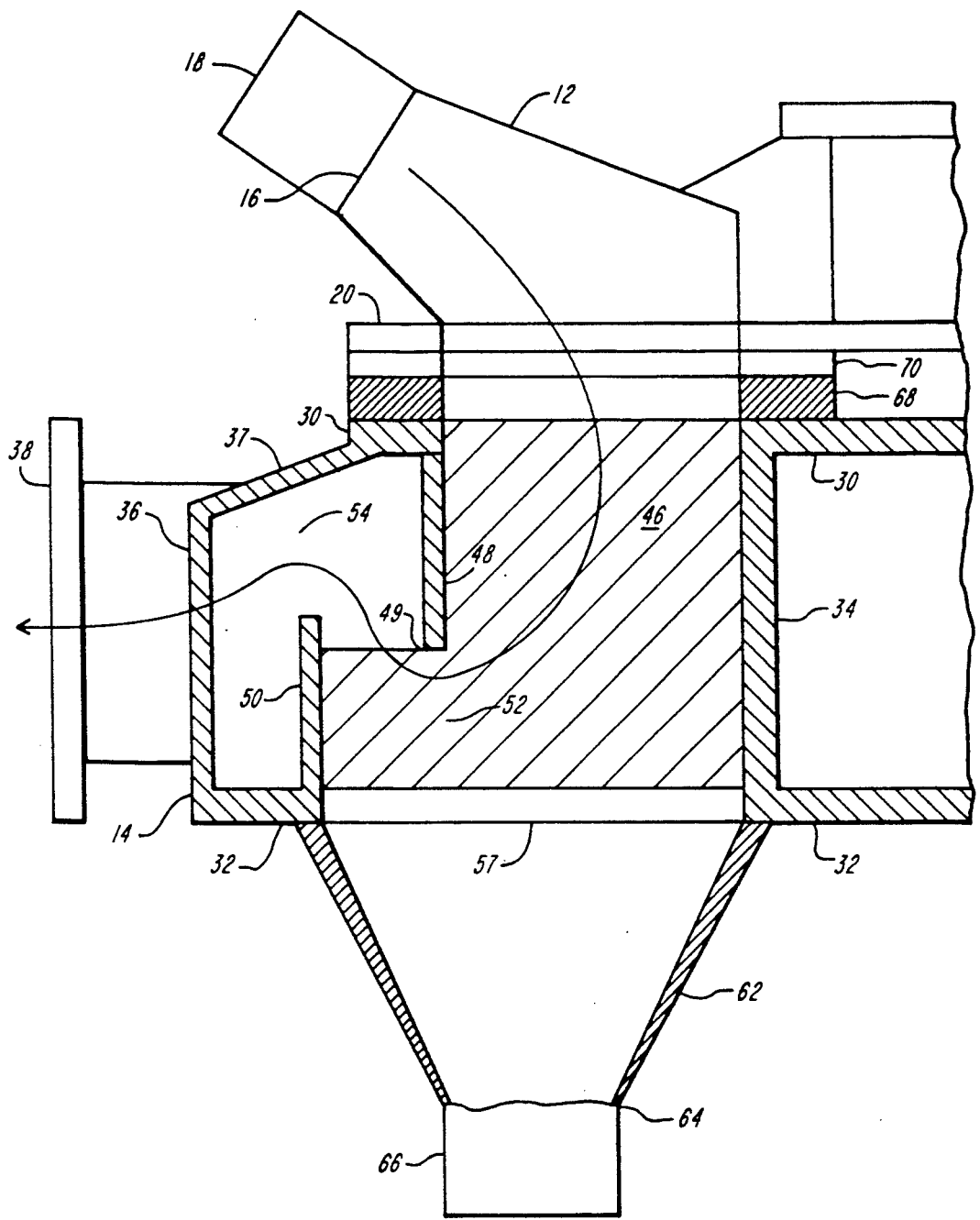
FIG. 4 is a side view of the distributor valve of the present invention.

As shown in FIGS. 3 and 4, the stationary separator 14 is divided into primary vacuum chambers 21 to 25, a secondary vacuum chamber 26 and compartments 27 and 28. The primary vacuum chambers 21 to 25 are connected to a primary vacuum source (not shown) through vacuum ports 38 and 39. The secondary vacuum chamber 26 is connected to a secondary vacuum source (not shown) through vacuum port 41. Compartment 27 is connected to a pressure source (not shown) through pressure port 51. Compartment 28 has a drain 61 at the bottom thereof. The separator 14 includes an upper plate 30, a lower plate 32, an inner wall 34 and an outer wall 36. Inner wall 34 extends vertically from the lower plate 32 to the upper plate 30. Outer wall 36 extends vertically from lower plate 32 to a sloping cover 37.

The chambers 21 to 26 are separated from the compartments 27 and 28 by radial panels 53 and 42 which extend radially from the inner wall 34 to the outer wall 36. The primary vacuum chambers 21 to 25 are divided by moveable radial partitions 43 to 46. Radial partitions 43 to 46 are moveable such that the circumferential location of radial partitions 43 to 46 within separator 14 can be changed in order to vary the size of primary vacuum chambers 21 to 25. Primary vacuum chamber 25 is separated from secondary vacuum chamber 26 typically by a fixed radial panel 40 which extends radially from inner wall 34 to outer wall 36. It is also understood that radial panel 40 may be moveable such that the size of secondary chamber 26 may be changed.

The separator 14 also includes an inner baffle 48 and an outer baffle 50. Inner baffle 48 is located at a generally constant radial distance between the inner wall 34 and outer wall 36. Outer baffle 50 is located at a generally constant radial distance between the inner baffle 48 and outer wall 36. Inner baffle 48 and outer baffle 50 extend circumferentially from radial panel 53 to radial panel 42. The inner baffle 48 is attached to upper plate 30 and extends downwardly. The outer baffle 50 is attached to lower plate 32 and extends upwardly to a height just above the lowest portion 49 of the inner baffle 48. It is understood that the vertical dimensions of baffles 48 and 50 may be varied, provided that outer baffle 50 extends upwardly to a height above the lowest portion 49 of inner baffle 48. For example, the inner baffle 48 may extend downwardly just over half the width of the separator 14 creating a lower passageway 52, while the outer baffle 50 extends just over half the width of the separator 14 creating an upper passageway 54. In addition, inner baffle 48 may be attached to lower plate 32, extending upwardly, while outer baffle 50 is attached to sloping cover 37, extending downwardly.

The radial partitions 43 to 46 extend radially from the inner wall 34 to the outer baffle 50. Between inner wall 34 and inner baffle 48, the radial partitions 43 to 46 extend vertically from the lower plate 32 to the upper plate 30. Between inner baffle 48 and outer baffle 50, the radial partitions 43 to 46 extend vertically from the lower plate 32 to the lowest portion 49 of inner baffle 48.

It is further understood that radial partitions 43 to 46 may have other planform dimensions beyond that described above. For example, radial partitions 43 to 46 may have a rectangular planform, extending radially from inner wall 34 to outer baffle 50 and vertically from lower plate 32 to upper plate 30 and sloping cover 37.

Primary vacuum chamber 21 has, at the bottom thereof, a round discharge outlet 47. All or part of the primary vacuum chambers 22 to 25 have, at the bottom thereof, oval discharge outlets 56 to 59. Discharge outlets 56 to 59 extend radially toward outer baffle 50. Attached to and communicating with discharge outlets 56 to 59 are truncated cone-shaped ducts 62. Cone-shaped ducts 62 are attached at their lower ends 64 to and communicate with liquid down legs 66 which are in turn connected to liquid collecting devices (not shown). The oval shape of discharge outlets 56 to 59 reduces vortexing of the liquid filtrate as it travels down ducts 62 and down legs 66. The existence of vortexing fosters scaling by allowing the filtrate to cool and prevents the liquid from freely exiting the separator 14, thereby lowering the hydraulic capacity of the distributor valve 10. A round discharge outlet 55 is located at the bottom of chamber 26. Round discharge outlets 47 and 55 of chambers 21 and 26, respectively, are used because of the generally low volume of liquid produced, as compared with primary compartments 22 to 25.

The inlet manifold 12 rotates about the stationary separator 14 such that the inlets 16 cyclically communicate in sequence with the chambers 21 to 26 and compartments 27 and 28. As shown in FIG. 3, the inlet manifold 12 rotates in a clockwise direction. It is further understood, however, that distributor valve 10 may be arranged such that inlet manifold 12 rotates in a counter-clockwise direction. The manifold base plate 20 and the separator upper plate 30 have passageways (not shown) in order for the inlets 16 to communicate with the separator 14. A first annular-shaped seal face 68 is located upon the separator upper plate 30. An annular-shaped wear resistant seal face 70 is located between the manifold base plate 20 and the first seal face 68.

The distributor valve 10 of the invention operates as follows. Feed slurry is fed into the cells 4 when the cells 4 are connected to the primary vacuum source (not shown) through the distributor valve 10 and the flexible hoses 18 connecting the distributor valve 10 and the cells 4. A liquid/gas filtrate is drawn into the manifold 12 under the influence of the vacuum. Depending on the cyclic position of the specific cell 4, the liquid/gas filtrate is directed into a primary vacuum chamber 21 to 25. The liquid portion falls by inertia and gravity into the ducts 62, while the gases, subjected to the vacuum, are exhausted horizontally. As shown by the arrow in FIG. 4, the gases must first travel under the inner baffle 48 and then over the outer baffle 50, causing a substantial change of direction. This change in direction aids the separation of liquid from the gases. The separated liquid falls under the force of gravity into the discharge ducts 62. The separated gases continue to be drawn horizontally toward the vacuum source (not shown) through vacuum ports 38, 39 and 41. The liquid collected in the ducts 62 flows into the liquid downlegs 66.

What is claimed is:

1. A distribution system for use with a filtering cell, the system comprising:

an inlet manifold rotatably mounted substantially concentrically above a stationary separator, the separator including an upper surface, a lower surface, an inner wall and an outer wall;

at least one separation chamber inside the separator connected to a vacuum source;

a first baffle extending downwardly from the upper surface of the separator in the separation chamber and located between the inner wall and the outer wall; and a second baffle located in the separation chamber between the first baffle and the outer wall, extending upwardly from the lower surface of the separator in the separation chamber to a point above the lowest portion of the first baffle.

2. The distributor system of claim 1 wherein the first and second baffles extend just over half the height of the separation chamber.

3. The distributor system of claim 1 wherein the first and second baffles extend three-quarters of the height of the separation chamber.

4. The distributor system of claim 1 wherein the separator comprises several separation chambers which are connected to a vacuum source and the separation chambers are divided by moveable radial partitions which can be repositioned circumferentially to vary the size of the separation chambers.

5. The distributor system of claim 4 wherein the radial partitions extend vertically from the lower plate to the upper plate between the inner wall and the first baffle and from the lower plate to a bottom point on the first baffle between the first baffle and the second baffle.

6. A distributor system for use with a filtering cell, the system comprising an inlet manifold rotatably mounted substantially concentrically above a stationary separator, the separator including an upper surface, a lower surface, an inner wall and an outer wall;

at least one separation chamber inside the separator connected to a vacuum source;

a first baffle extending upwardly from the lower surface of the separator in the separation chamber and located between the inner wall and the outer wall; and a second baffle extending downwardly from the uppersurface of the separator in the separation chamber to a point below the highest portion of the first baffle.

* * * * *

UNITED STATES PATENT AND TRADEMARK OFFICE
CERTIFICATE OF CORRECTION

PATENT NO. : 5,298,057
DATED : March 29, 1994
INVENTOR(S) : Arthur W. Burt

It is certified that error appears in the above-indentified patent and that said Letters Patent is hereby corrected as shown below:

In the drawings, Sheet 3, Fig. 3, radial partition 45 should not extend beyond outer baffle 50.

Signed and Sealed this

Eighth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,298,057　　　　　　　　　　　　　　Page 2 of 2
DATED      : March 29, 1994
INVENTOR(S): Arthur W. Burt It is certified that error appears in the above-indentified patent and that said Letters Patent is hereby corrected as shown below:

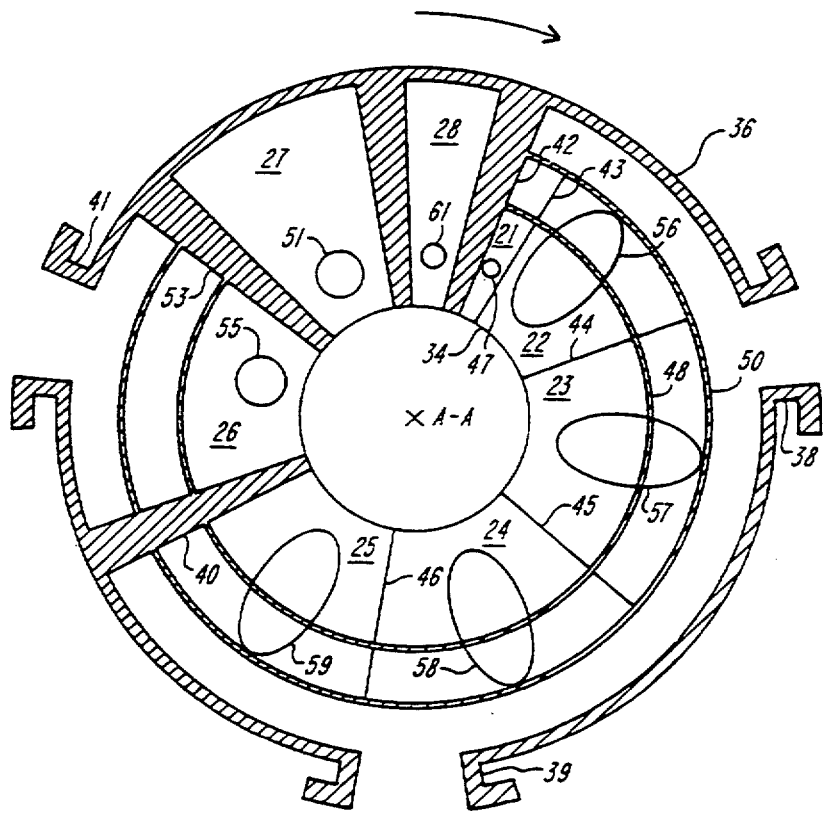

*FIG. 3*